(12) United States Patent
Jung et al.

(10) Patent No.: US 7,607,143 B2
(45) Date of Patent: Oct. 20, 2009

(54) TRAY MECHANISM FOR DISK DRIVE AND DISK DRIVE USING THE SAME

(75) Inventors: Young-sun Jung, Suwon-si (KR); Pil-je Cho, Yongin-si (KR); Kyu-hyeong Lee, Suwon-si (KR); Chung-ung Kim, Yongin-si (KR); Sung-hun Lee, Suwon-si (KR); Young-woo Huh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 629 days.

(21) Appl. No.: 11/070,306

(22) Filed: Mar. 3, 2005

(65) Prior Publication Data

US 2005/0198655 A1 Sep. 8, 2005

(30) Foreign Application Priority Data

Mar. 5, 2004 (KR) ...................... 10-2004-0015198

(51) Int. Cl.
*G11B 17/30* (2006.01)
*G11B 17/04* (2006.01)

(52) U.S. Cl. ...................... 720/607; 720/608

(58) Field of Classification Search ......... 720/601–602, 720/607–610, 613, 657
See application file for complete search history.

(56) References Cited

U.S. PATENT DOCUMENTS

| 5,473,593 | A | * | 12/1995 | Wheeler | ...................... 720/608 |
| 2002/0172140 | A1 | * | 11/2002 | Oishi et al. | .................. 369/291 |
| 2005/0076348 | A1 | * | 4/2005 | Sun | ........................... 720/608 |

FOREIGN PATENT DOCUMENTS

| JP | 60-070547 | 4/1985 |
| KR | 1987-14319 | 10/1990 |
| KR | 1991-23897 | 5/1994 |
| KR | 1993-8682 | 6/1995 |
| KR | 10-1995-0010962 | 9/1995 |
| KR | 1994-33924 | 6/1998 |

* cited by examiner

*Primary Examiner*—Craig A Renner
*Assistant Examiner*—Nathan Danielsen
(74) *Attorney, Agent, or Firm*—Staas & Halsey LLP (57) ABSTRACT

A tray mechanism and a disk drive employing the tray mechanism. The tray mechanism includes a driving member rotatably coupled to a spindle motor; a pinion meshed with a rack provided at a surface of a tray to load the tray onto and unload the tray from a main frame; a pivotable plate pivotally provided at a shaft of the driving member, and having a connector which couples the driving member and the rack; and a limiting member provided on the main frame for limiting a pivotal range of the pivotable plate.

13 Claims, 10 Drawing Sheets

FIG. 14

TRAY MECHANISM FOR DISK DRIVE AND DISK DRIVE USING THE SAME

CROSS-REFERENCE TO RELATED APPLICATION

This application claims the priority of Korean Patent Application No. 2004-15198, filed on Mar. 5, 2004, in the Korean Intellectual Property Office, the disclosure of which is incorporated herein by reference.

BACKGROUND OF THE INVENTION

1. Field of the Invention

The present invention relates to a disk drive, and more particularly, to a tray mechanism for a disk drive in which a tray is loaded onto or unloaded from a main frame by use of a driving force of a spindle motor, and a disk drive using the same.

2. Description of Related Art

Figure 1:
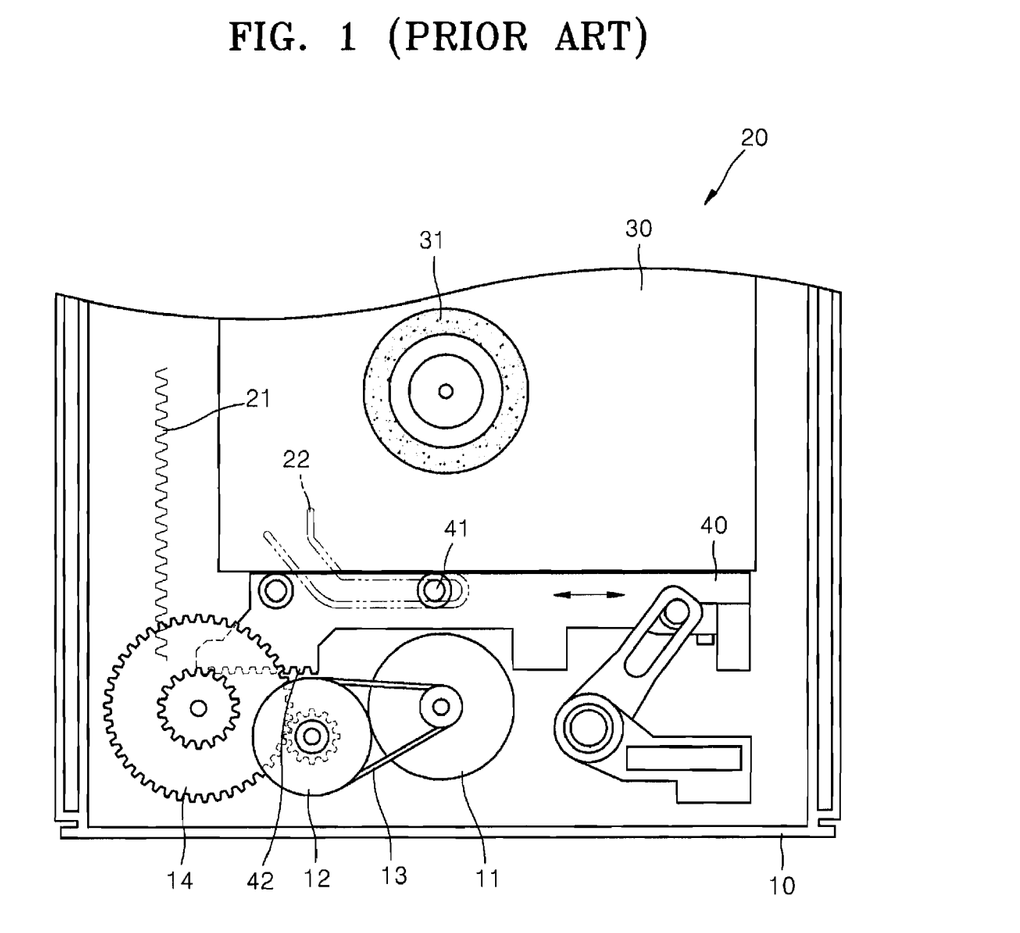
FIG. 1 is a top view depicting a conventional disk drive.

FIG. 1 is a top perspective view depicting a construction of a conventional disk drive.

Referring to FIG. 1, the disk drive includes a main frame 10, a tray 20 loadable onto and unloadable from the main frame 10, with a disk (not shown) being seated thereon, and a base frame 30 having a turntable 31 on which a disk is seatable. The base frame 20 is movably installed to the main frame 10.

The tray 20 is provided at a bottom surface thereof with a rack gear 21 along a moving direction of the tray toward the main frame 10, and a guide 22 positioned adjacent to the rack gear 21. The guide 22 has a specified length and is bent at a specified angle.

In order to load/unload the tray 20, the main frame 10 includes a drive motor 11, an intermediate gear 12 connected to the drive motor 11 through a belt 13 for receiving the driving force, and a pinion gear 14 meshed with the intermediate gear 12 and the rack gear 21.

On the main frame 10 a slide cap 40 is mounted to linearly reciprocate in a direction perpendicular to a loading/unloading direction of the tray 20. A cam gear 42, which meshes with the pinion gear 14, is formed on an end of the slide cam 40, and a protrusion 41, which engages the guide 22, is formed in the slide cam 40.

The slide cam 40 has a protrusion 41 so that it can be guided by engagement with the guide 22.

The base frame 30 is adapted to move up and down with respect to the main frame 10 by the slide cam 40.

A loading and unloading operation of the tray in the conventional disk drive configured as descried above will be described.

Firstly, the operation of loading the tray 20 on the main frame 10 will now be described.

When the tray 20 is unloaded from the main frame 10, a driving force of the drive motor 11 is transferred to the tray 20 through the belt 13, the intermediate gear 12, the pinion gear 14, and the rack gear 21, to load the tray 20 on the main frame 10.

If the tray 20 is loaded on the main frame 10 to a certain degree, the protrusion 41 abuts against the guide 22 and is thus guided by the guide 22. The cam gear 42 is meshed with the pinion gear 14, and the slide cam 40 receives the driving force from the pinion gear 14 to slide.

While the slide cam 40 slides, the base frame 30 slowly moves to an upper portion of the main frame 10. When loading of the tray 20 on the main frame 10 is completed, the base frame 30 is completely moved to the upper portion of the main frame 10, such that the disk (not shown) seated on the tray 20 is mounted and clamped on the turntable 31. A spindle motor (not shown) coaxially installed to the turntable 31 rotates to turn the disk (not shown), and an optical pickup unit (not shown) reciprocates in the radial direction of the disk to write the data on the disk or read the data from the disk.

The operation of unloading the tray 20 from the main frame 10 is to the same as the loading operation, but in reverse.

In the conventional disk drive of FIG. 1, the operation of loading/unloading the tray on or from the main frame is achieved by the drive motor, while the operation of turning the disk is achieved by the spindle motor provided separately.

Therefore, since the operations of the tray and the disk are independently achieved by separate motors, the manufacturing cost of the conventional disc drive is increased, and the main frame for installing each motor is complicated. Also, the entire weight of the construction is increased.

BRIEF SUMMARY

An aspect of the present invention provides a tray mechanism for a disk drive, in which a tray is loaded on or unloaded from a main frame by use of a driving force of a spindle motor, so that a construction of the disk drive can be simplified.

According to an aspect of the present invention, there is provided a tray mechanism for a disk drive, including: a driving member rotatably coupled to a spindle motor; a pinion meshed with a rack provided at a surface of a tray to load the tray onto and unload the tray from a main frame; a pivotable plate pivotally provided at a shaft of the driving member, and having a connector which couples the driving member and the rack; and a limiting member provided on the main frame for limiting a pivotal range of the pivotable plate.

According to another aspect of the present invention, there is provided a disk drive including a main frame, a tray mechanism for loading a tray onto and unloading the tray from the main frame, and a spindle motor for turning a turntable on which a disk is seatable, the tray mechanism including: a driving member rotatably coupled to the spindle motor; a pinion meshed with a rack provided at a surface of the tray to load/unload the tray on/from the main frame; a pivotable plate pivotally installed to a shaft of the driving member, and provided with a connector for coupling the driving member and the rack; and a limiting member provided on the main frame for limiting a pivotal range of the pivotable plate.

According to another aspect of the present invention, there is provided a tray mechanism including: a driving member rotatable about a first shaft and including a groove receiving a coupler transferring a driving force from a spindle motor and a driving gear for transferring a rotating force of the driving member to a connector; a pivotal plate including on a surface a second shaft rotatably receiving the connector and spaced apart from the first shaft, and a stop portion protruding outward from a side of the pivotable plate; a pinion including a pinion gear, a rack gear on a first side of the pinion gear, and a cam on a second side of the pinion gear, the cam driving gear being meshable with a cam gear of a slider cam to slide the slider cam; a limiting member which limits a pivotal range of the pivotable plate, and includes an elastic part protruding from a surface, and a stop part adjacent to the elastic part and protruding from the surface farther than the elastic part. The connector includes a connecting gear which is meshable with the driving gear, and a pinion driving gear provided under the connecting gear and which is meshable with the pinion gear and, when the pivotable plate pivots around the first shaft, the stop portion of the pivotable plate moves along the upper surface of the elastic part, a pivotal speed of the pivotable plate is continuously reduced, and the stop portion contacts with a stop part to stop the pivotal movement of the pivotable plate.

According to another aspect of the present invention, there is provided a method of driving a tray mechanism for a disk drive, the tray mechanism including a driving member, a pinion meshed with a rack provided at a surface of a tray to load the tray onto and unload the tray from a main frame; a pivotable plate which pivots about a shaft of the driving member and has a connector which couples the driving member and the rack; and a limiting member provided on the main frame for limiting a pivotal range of the pivotable plate, the method including: rotatably coupling a driving member to a spindle motor; rotating the driving member; transferring a rotating force of the driving member to the pinion through at least one gear; pivoting a pivotable plate; and impeding the pivotal movement of the pivotable plate at a specified pivot location.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
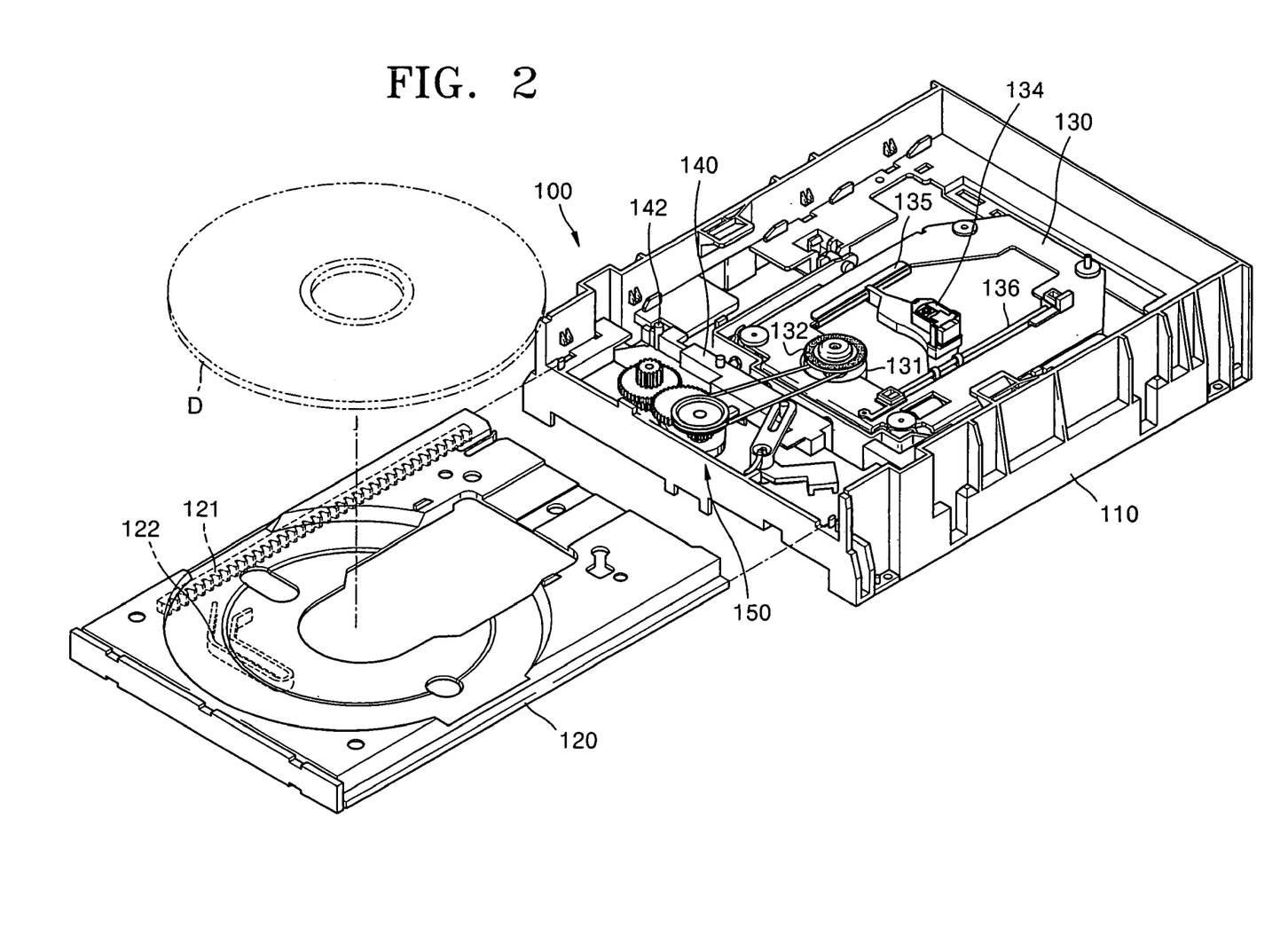
FIG. 2 is a perspective view of a disk drive employing a tray mechanism according to an embodiment of the present invention.

Referring to FIG. 2, a disk drive 100 includes a main frame 110, a tray 120 loadable onto and unloadable from the main frame 110, a slider cam 140 sliding in a direction perpendicular to an accessing direction (referred to hereafter as a horizontal direction) of the tray 120 to the main frame 110 to move up and down the base frame 130, and a tray mechanism 150 for accessing the tray 120 to the main frame 110. A disk D is mountable on the tray 120.

The tray 120 is provided at a bottom surface thereof with a rack gear 121 along a moving direction of the tray toward the main frame 110, and a guide 122 positioned adjacent to the rack gear 121 for guiding a sliding movement of the slider cam 140.

The base frame 130 includes a spindle motor 131, a turntable 132 coaxially installed to a rotary shaft 133 of the spindle motor 131 and is configured to accept the disk D, and an optical pickup unit 134 slidably installed along guide shafts 135 and 136 in a radical direction of the disk D for reading a data from the disk D or writing the data on the disk D by irradiating a light onto the disk D.

Figure 3:
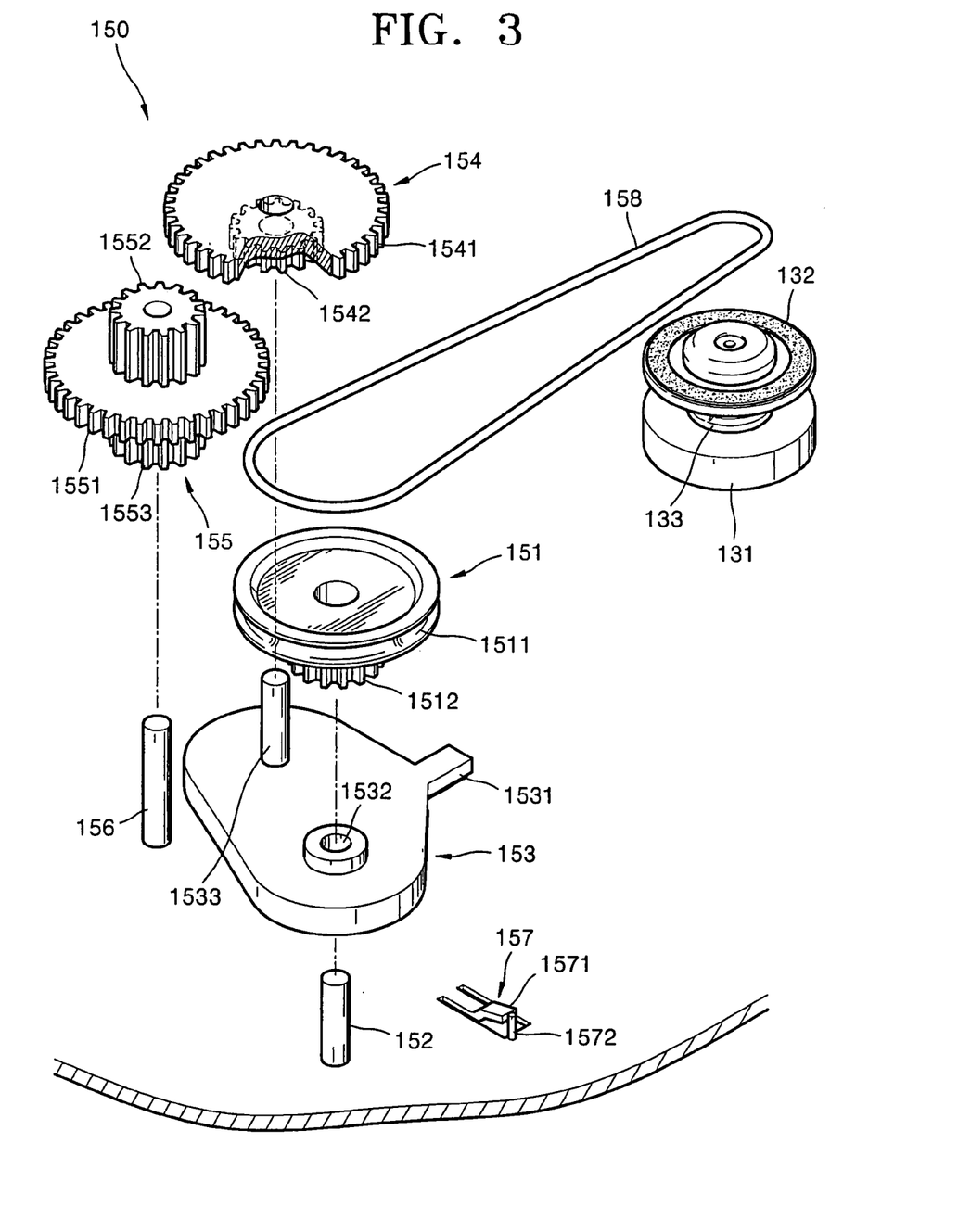
FIG. 3 is an exploded perspective view of the tray mechanism of FIG. 2.
Figure 4:
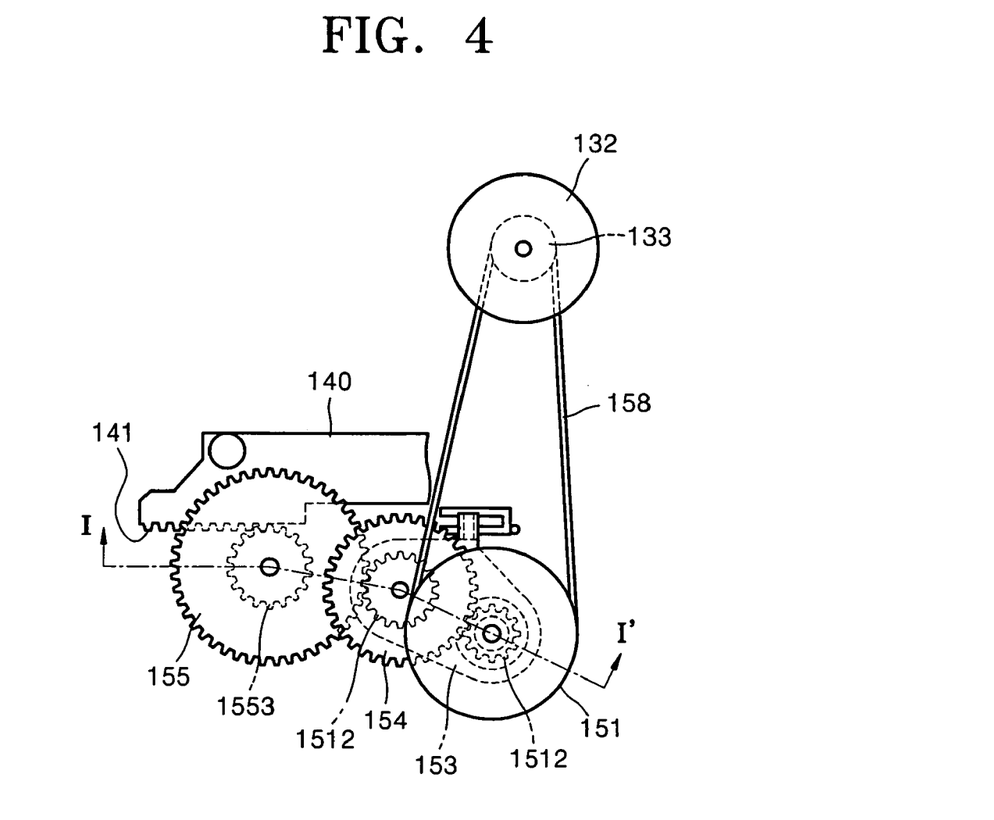
FIG. 4 is a top view of the tray mechanism of FIG. 2.
Figure 5:
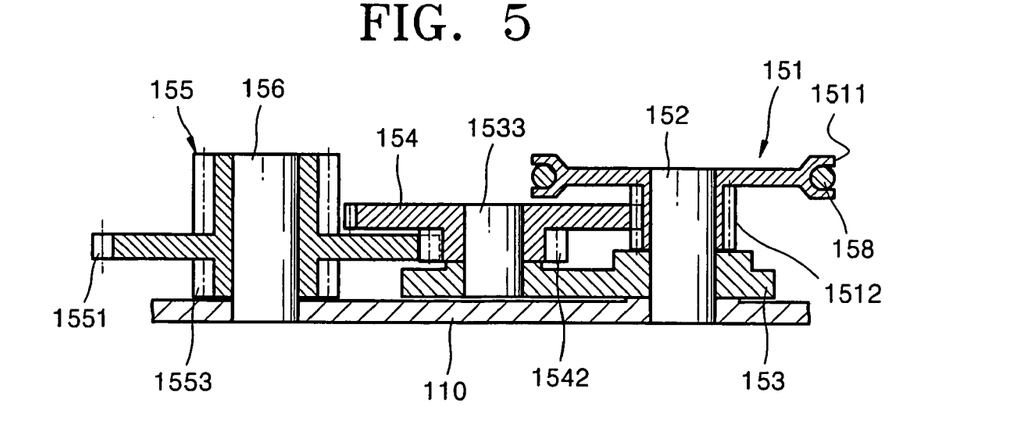
FIG. 5 is a cross-sectional view taken along a line I-I' in FIG. 4.

Referring to FIGS. 3 through 5, the tray mechanism 150 includes a driving member 151, a pivotal plate 153, a connector 154, a pinion 155, and a limiting member 157.

The driving member 151 is rotatably installed on a shaft 152 mounted in the main frame 110 of FIG. 2, and includes a groove 1511 for receiving a coupler 158 transferring a driving force from the spindle motor 131 of FIG. 2, and a driving gear 1512 for transferring a rotating force to the connector 154.

The coupler 158 couples the spindle motor 131 of FIG. 2 to the driving member 151 to rotate the driving member. In this embodiment, a belt is used as the coupler 158. However, it is to be understood that the present embodiment is not limited thereto. Indeed, it is contemplated that myriad variations may be provided to transfer the driving force between the two shafts. The groove 1511 is variable depending upon a cross-sectional shape of the coupler 158.

The pivotal plate 153 is pivotally installed on the shaft 152. The pivotable plate 153 includes a shaft 1533 for rotatably receiving the connector 154 and spaced apart from the shaft 152 at a desired interval, on an upper surface of the pivotable plate 153, and a stop portion 1531 protruded outward from one side of the pivotable plate.

The pinion 155 is rotatably installed on a shaft 156 provided to the main frame 110 of FIG. 2, and includes a pinion gear 1551 having a relatively large diameter, and a rack gear 1552 and a cam driving gear 1553 each provided on upper and lower portions of the pinion gear 1551 and having a small diameter relative to that of the pinion gear 1552. The cam driving gear 1553 is meshed with a cam gear 141 of the slider cam 140 of FIG. 2 to slide the slider cam 140 in a horizontal direction.

The connector 154 is rotatably installed on the shaft 1533, and includes a connecting gear 1541 meshed with the driving gear 1512, and a pinion driving gear 1542 provided under the connecting gear 1541 and meshed with the pinion gear 1551.

The limiting member 157 is provided in the main frame 110 to limit a pivotal range of the pivotable plate 153, and includes an elastic part 1571 formed by cutting a portion of the main frame 110 and bending the cut portion upwardly to protrude it from the upper surface of the main frame 110 and thus having an elastic force, and a stop part 1572 protruded from the upper surface of the main frame 110 adjacent to the elastic part 1571 in a height higher than that of the elastic part 1571.

Therefore, when the pivotable plate 153 pivots around the shaft 152, the stop portion 1531 of the pivotable plate 153 moves along the upper surface of the elastic part 1571. At this time, a pivotal speed of the pivotable plate 153 is continuously reduced, and the stop portion 1531 is contacted with the stop part 1572 to stop the pivotal movement of the pivotable plate 153.

The operation of the tray mechanism according to the present embodiment will be described with reference to the accompanying drawings.

First, a process of loading the tray on the main frame will be described.

Figure 6:
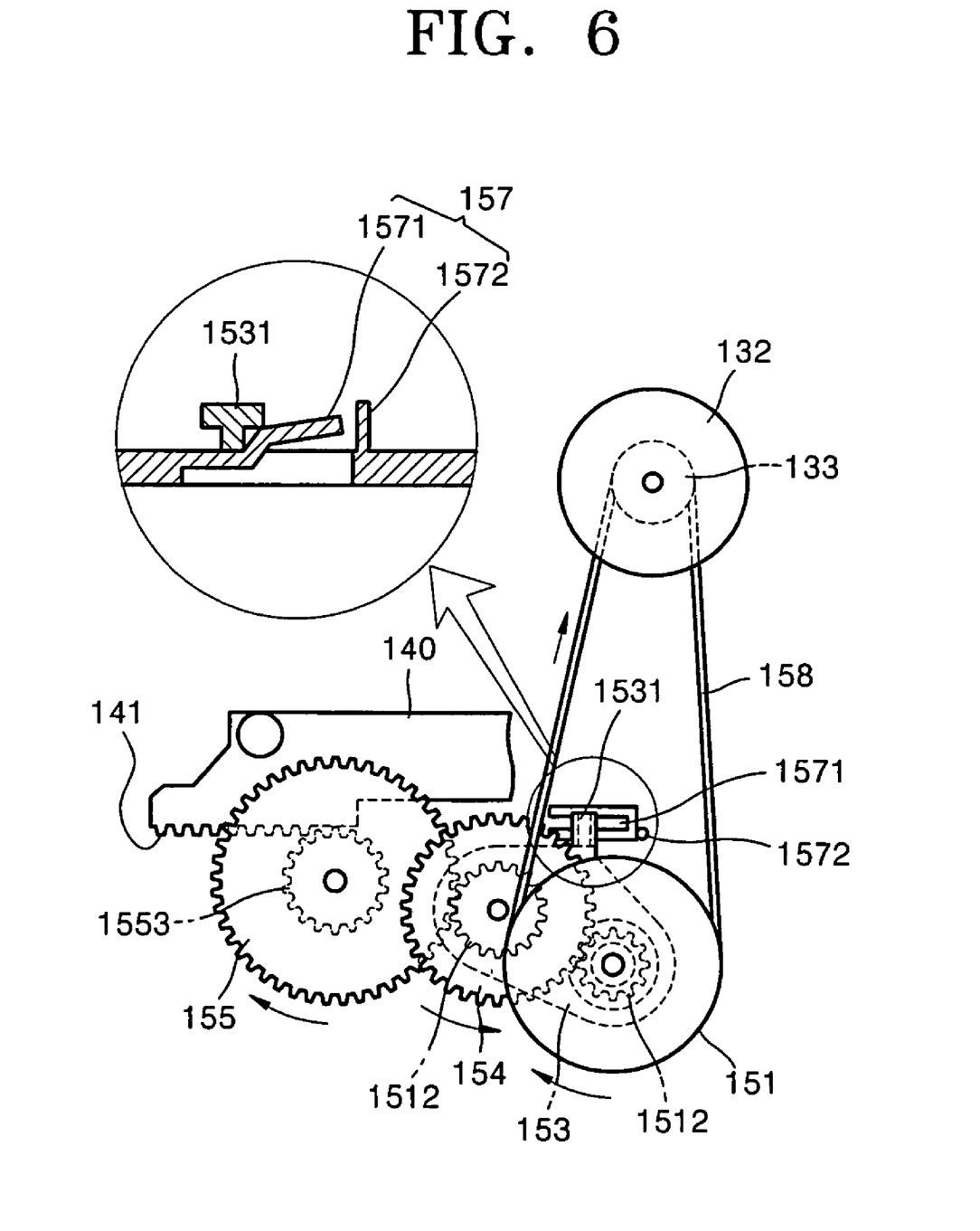
FIGS. 6 through 10 are top views depicting a loading process of a tray on a main frame using the tray mechanism of FIG. 2.

Referring to FIGS. 2 and 6, the driving member 151 is coupled to the spindle motor 131 via the connector 158, so that the driving member is rotated in a clockwise direction by the spindle motor 131. The rotating force of the driving member 151 is transferred to the pinion 155 through the driving gear 1512, the connecting gear 1541, the pinion driving gear 1542, and the pinion gear 1551. At this time, the cam gear 141 is not meshed with the cam driving gear 1553.

The pivotable plate 153 tends to pivot around the shaft 152 in a clockwise direction, since the driving gear 1512 is meshed with the connecting gear 1541. However, the stop potion 1531 is contacted with the elastic part 1571, such that the pivotal movement of the pivotable plate 153 is impeded by a frictional force generated between the stop portion 1531 and the elastic part 1571, due to the elastic force of the elastic part 1571.

Figure 7:
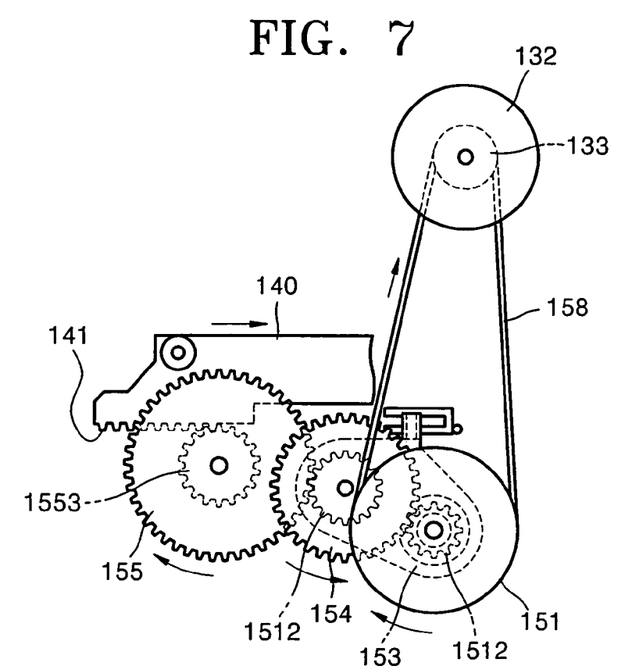

Referring to FIGS. 2 and 7, when the tray 120 is loaded on the main frame 110, the guide 122 guides the protrusion 142 to slide the protrusion in a vertical direction, and the cam gear 141 is meshed with the cam driving gear 1553.

Figure 8:
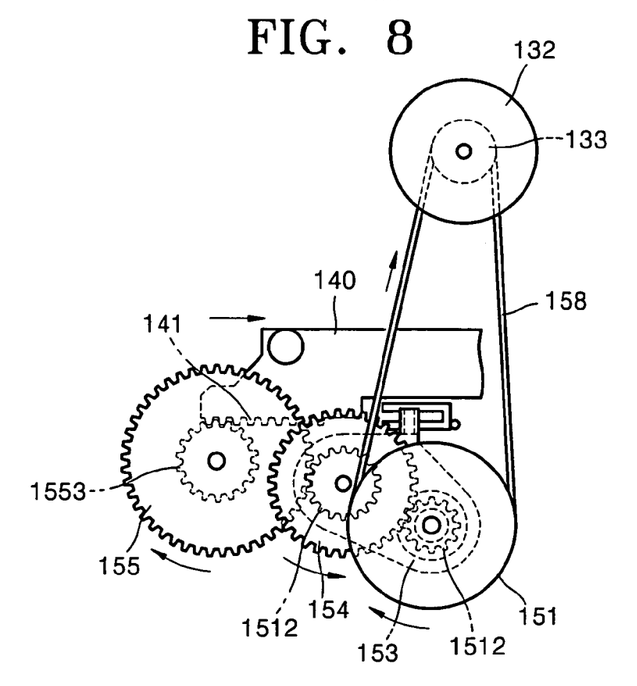

Referring to FIGS. 2 and 8, when the cam gear 141 is meshed with the cam driving gear 1553, the slider cam 140 is moved in a vertical direction by rotation of the cam driving gear 1553, and the base frame 130 is gradually lifted.

Figure 13:
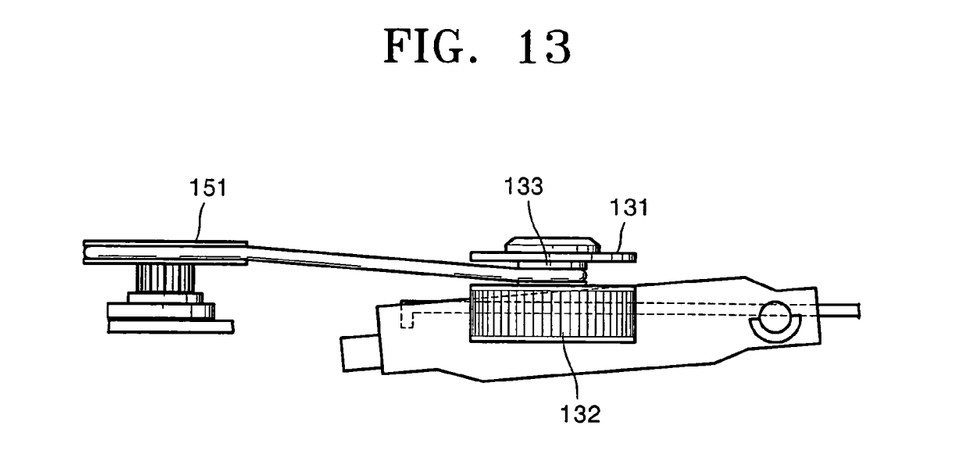
FIGS. 13 and 14 are side views depicting a lifting operation of a base frame.
Figure 14:
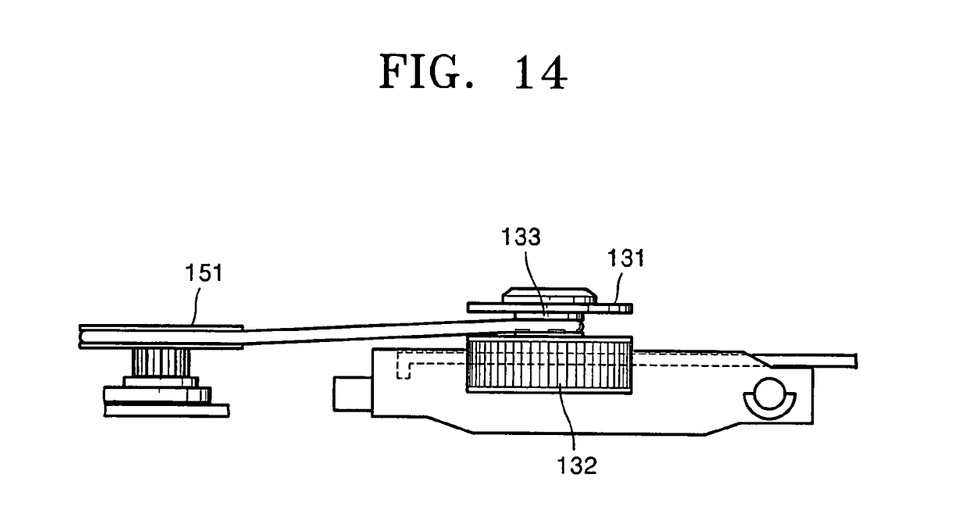

Specifically, referring to FIGS. 13 and 14, the slider cam 140 is moved in a vertical direction, and the base frame 130 is lifted from a lower position.

The connector 158 is adapted to smoothly transfer the driving force between the driving member 151 and the spindle motor 131, even though the base frame 130 is lifted upwardly.

Figure 9:
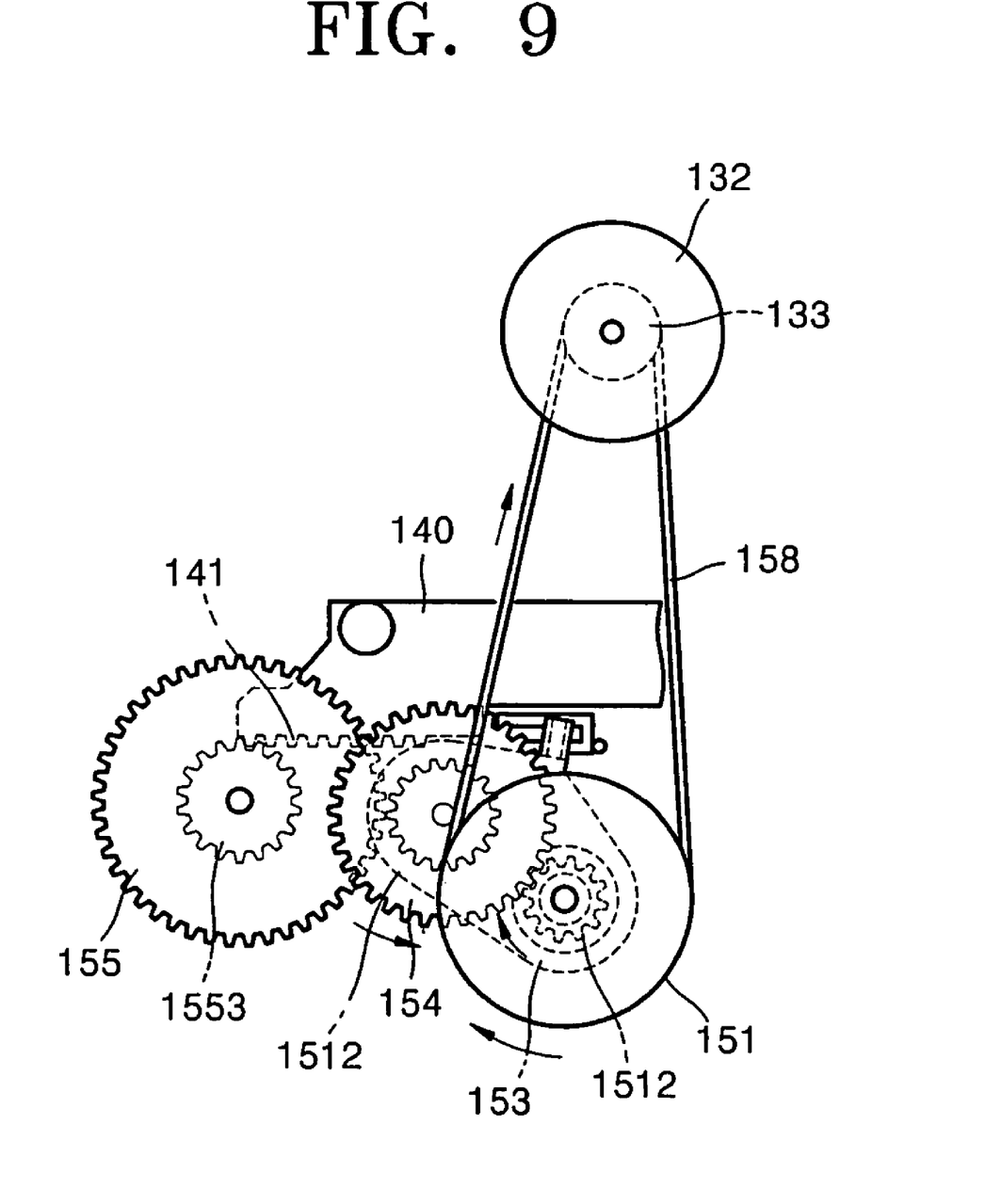

Referring to FIGS. 2 and 9, when the tray 120 is completely loaded on the main frame 110, the lifting operation of the base frame 110 is completed, so that the disk D is mountable on the turntable 132. The cam gear 141 is partially meshed with the cam driving gear 1553, and the pivotable plate 153 is pivoted around the shaft 152 by the transferred driving force, which releases the engagement between the pinion driving gear 1542 and the pinion gear 1551. Consequently, the pivotable plate 153 is pivoted around the shaft 152 in a clockwise direction. The stop portion 1531 is slid along the upper surface of the elastic part 1571.

Figure 10:
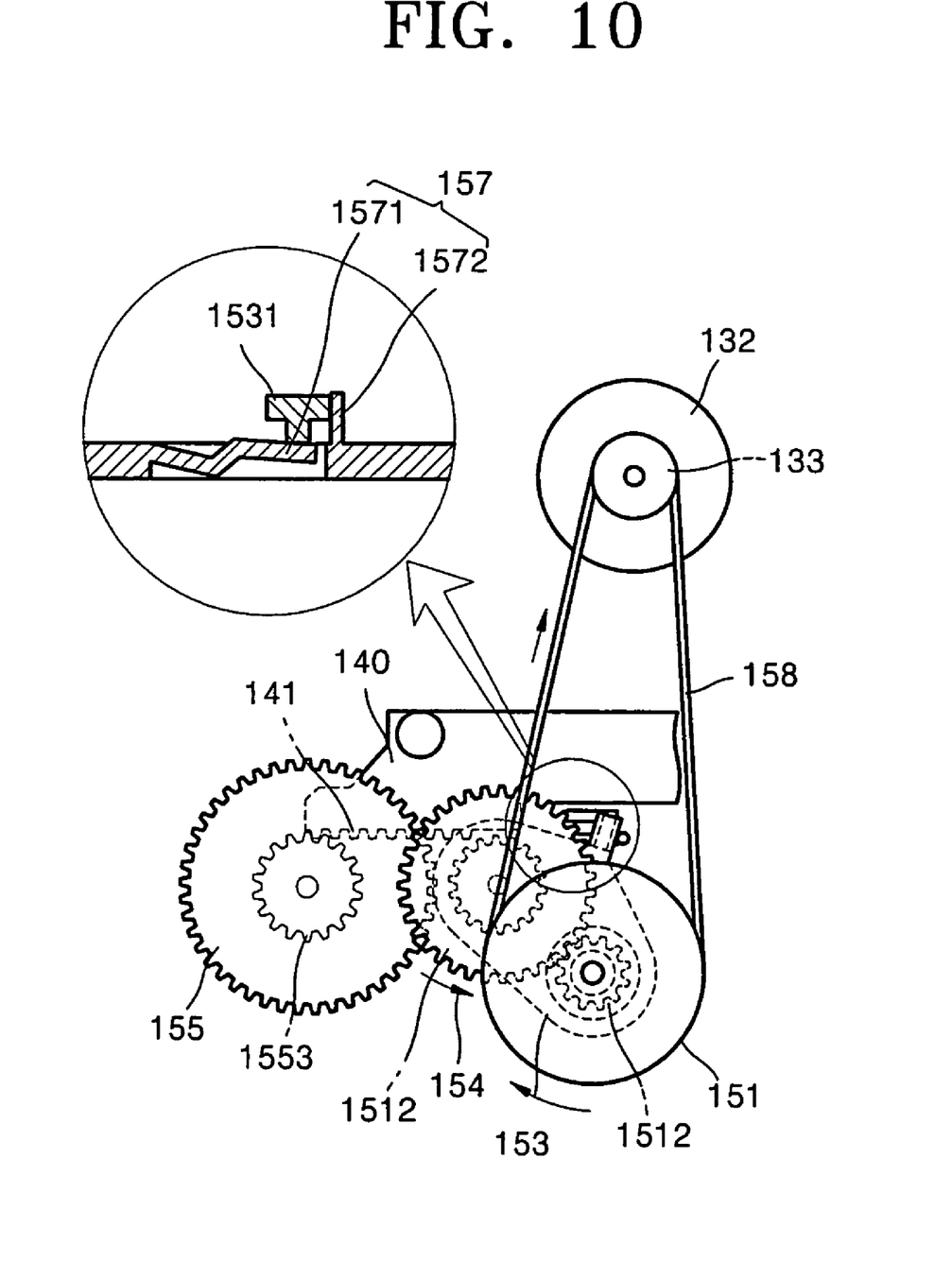

Referring to FIGS. 2 and 10, when the pivotable plate 153 is pivoted around the shaft 152 in a clockwise direction, the stop portion 1531 sliding along the upper surface of the elastic part 1571 is caught by the stop part 1572 to stop the pivotal movement of the pivotable plate.

At this time, since the spindle motor 131 rotates continuously, the driving member 151 and the connector 154 are also rotated. Since the pinion driving gear 1542 is not coupled to the pinion gear 1551, the pinion 155 does not rotate.

The optical pickup unit 134 travels (reciprocates) in a radial direction of the disk D to read the data from the disk D or write the data on the disk.

The process of unloading the tray from the main frame is described below.

Figure 11:
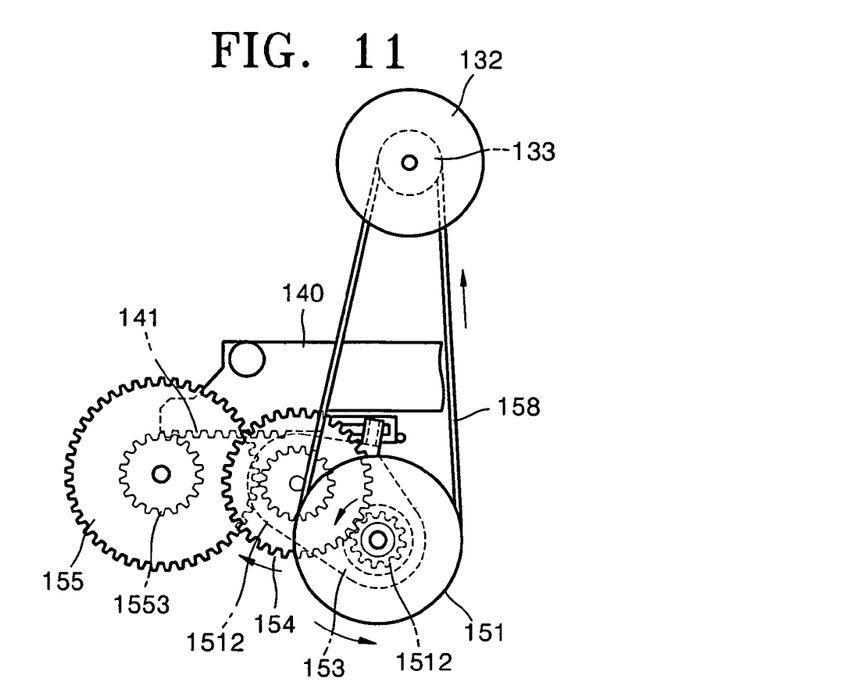
FIGS. 11 and 12 are top views depicting an unloading process of a tray on a main frame using the tray mechanism of FIG. 2.

Referring to FIGS. 2 and 11, when the read and write of the optical pickup unit 134 is completed, the spindle motor 131 is rotated in a counterclockwise direction, and the pivotable plate 153 is also rotated around the shaft 152 in a counterclockwise direction, such that the pinion driving gear 1542 is meshed with the pinion gear 1551. At this time, since the stop portion 1531 is spaced apart from the stop part 1572, the stop portion 1531 slides along the upper surface of the elastic part 1571.

Figure 12:
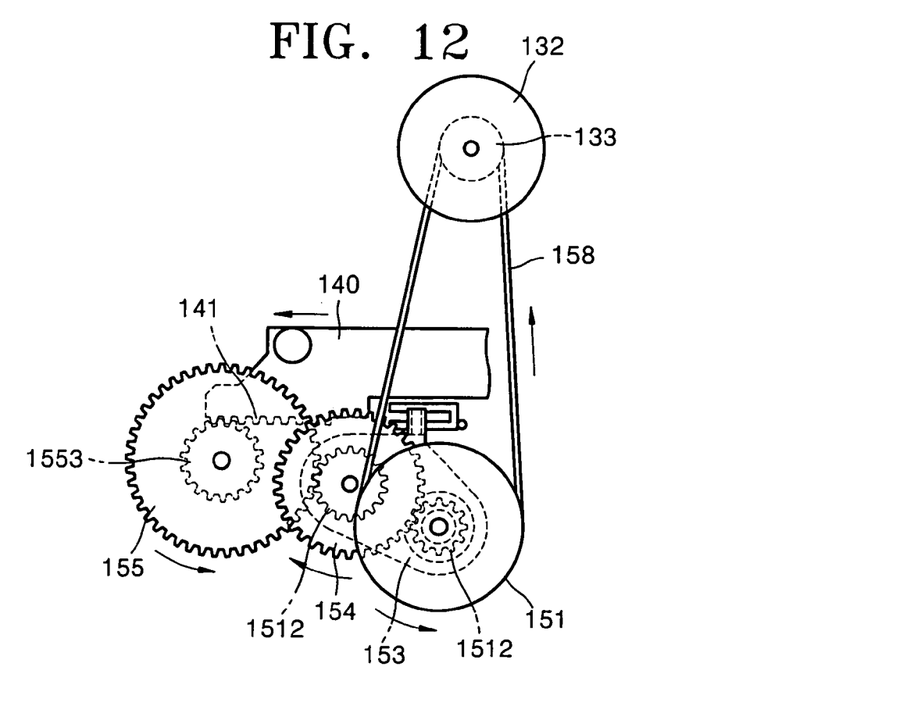

Referring to FIGS. 2 and 12, when the pinion 155 is rotated in a counterclockwise direction, the cam gear 141 receives the driving force from the cam driving gear 1553 to slide the slider cam 140 in a vertical direction. When the slider cam 140 slides in a vertical direction, the base frame 110 is lowered, such that the disk D is released from the coupling engagement with turntable 132. At this time, the tray 120 is unloaded from the main frame 110 by meshing the rack 121 with the rack gear 1552.

With the above structure, the tray mechanism of the present embodiment can drive the tray using the rotating force of the spindle motor, thereby simplifying the structure and thus reducing the manufacturing cost of the disk drive.

Although an embodiments of the present invention has been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A tray mechanism for a disk drive, comprising:
   a driving member rotatably coupled to a spindle motor;
   a pinion meshed with a rack provided at a surface of a tray to load the tray onto and unload the tray from a main frame;
   a pivotable plate pivotally provided at a shaft of the driving member, and having a connector which couples the driving member and the pinion; and
   a limiting member provided on the main frame to mechanically limit a pivotal range of the pivotable plate,
   wherein the pivotable plate includes on a side thereof a stop portion which contacts the limiting member when the pivotable plate pivots to a specified location, and
   the limiting member includes an elastic part protruding from a surface of the main frame for urging the stop portion of the pivotable plate to pass upwardly over the elastic part, and a stop part adjacent to the elastic and protruding from the surface of the main frame part for contacting the stop portion to stop a pivotal movement of the pivotable plate, thereby limiting the movement of the pivotable plate.

2. The tray mechanism of claim 1, wherein the driving member is coupled to the spindle motor by a coupler.

3. The tray mechanism of claim 1, wherein the connector is provided on a shaft spaced apart from a pivotable shaft of the pivotable plate at a desired interval.

4. The tray mechanism of claim 1, wherein the elastic part is formed by cutting a portion of the main frame and bending the cut portion upwardly.

5. A disk drive including a main frame, a tray mechanism for loading a tray onto and unloading the tray from the main frame, and a spindle motor for turning a turntable on which a disk is seatable, the tray mechanism comprising:
   a driving member rotatably coupled to the spindle motor;
   a pinion meshed with a rack provided at a surface of the tray to load/unload the tray on/from the main frame;
   a pivotable plate pivotally installed to a shaft of the driving member, and provided with a connector for coupling the driving member and the pinion; and
   a limiting member provided on the main frame to mechanically limit a pivotal range of the pivotable plate,
   wherein the pivotable plate includes on a side thereof a stop portion which contacts the limiting member when the pivotable plate pivots to a specified location, and
   the limiting member includes an elastic part protruding from a surface of the main frame for urging the stop portion of the pivotable plate to pass upwardly over the elastic part, and a stop part adjacent to the elastic part and protruding from the surface of the main frame for contacting the stop portion to stop a pivotal movement of the pivotable plate, thereby limiting the movement of the pivotable plate.

6. The disk drive of claim 5, wherein the driving member is coupled to the spindle motor by a coupler.

7. The disk drive of claim 5, wherein the connector is provided on a shaft spaced apart from a pivotable shaft of the pivotable plate at a desired interval.

8. The disk drive of claim 5, wherein the elastic part is formed by cutting a portion of the main frame and bending the cut portion upwardly.

9. A tray mechanism comprising:
a driving member rotatable about a first shaft and including a groove receiving a coupler transferring a driving force from a spindle motor and a driving gear for transferring a rotating force of the driving member to a connector;
a pivotal plate including on a surface a second shaft rotatably receiving the connector and spaced apart from the first shaft, and a stop portion protruding outward from a side of the pivotable plate;
a pinion including a pinion gear, a rack gear on a first side of the pinion gear, and a cam on a second side of the pinion gear, the cam driving gear being meshable with a cam gear of a slider cam to slide the slider cam;
a limiting member which limits a pivotal range of the pivotable plate, and includes an elastic part protruding from a surface, and a stop part adjacent to the elastic part and protruding from the surface farther than the elastic part,
wherein the connector includes a connecting gear which is meshable with the driving gear, and a pinion driving gear provided under the connecting gear and which is meshable with the pinion gear, and
wherein, when the pivotable plate pivots around the first shaft, the stop portion of the pivotable plate moves along the upper surface of the elastic part, a pivotal speed of the pivotable plate is continuously reduced, and the stop portion contacts with the stop part to stop the pivotal movement of the pivotable plate, thereby limiting the movement of the pivotable plate.

10. The tray mechanism of claim 9, wherein the coupler is a belt.

11. The tray mechanism of claim 9, wherein the pinion gear has a diameter larger than a diameter that of the rack and cam gears.

12. The tray mechanism of claim 9, further comprising a protrusion part which is movable in a vertical direction when a tray movable by the tray mechanism is loaded onto a main frame of a disk drive,
wherein, when the protrusion part is moved in the vertical direction, the cam gear meshes with the cam driving gear.

13. The tray mechanism of claim 12, wherein, when the cam gear meshes with the cam driving gear, the slider cam is moved in the vertical direction by rotation of the cam driving gear, and a base frame which includes the spindle motor is gradually lifted from a first vertical position toward a second vertical position.

* * * * *